No. 870,188.

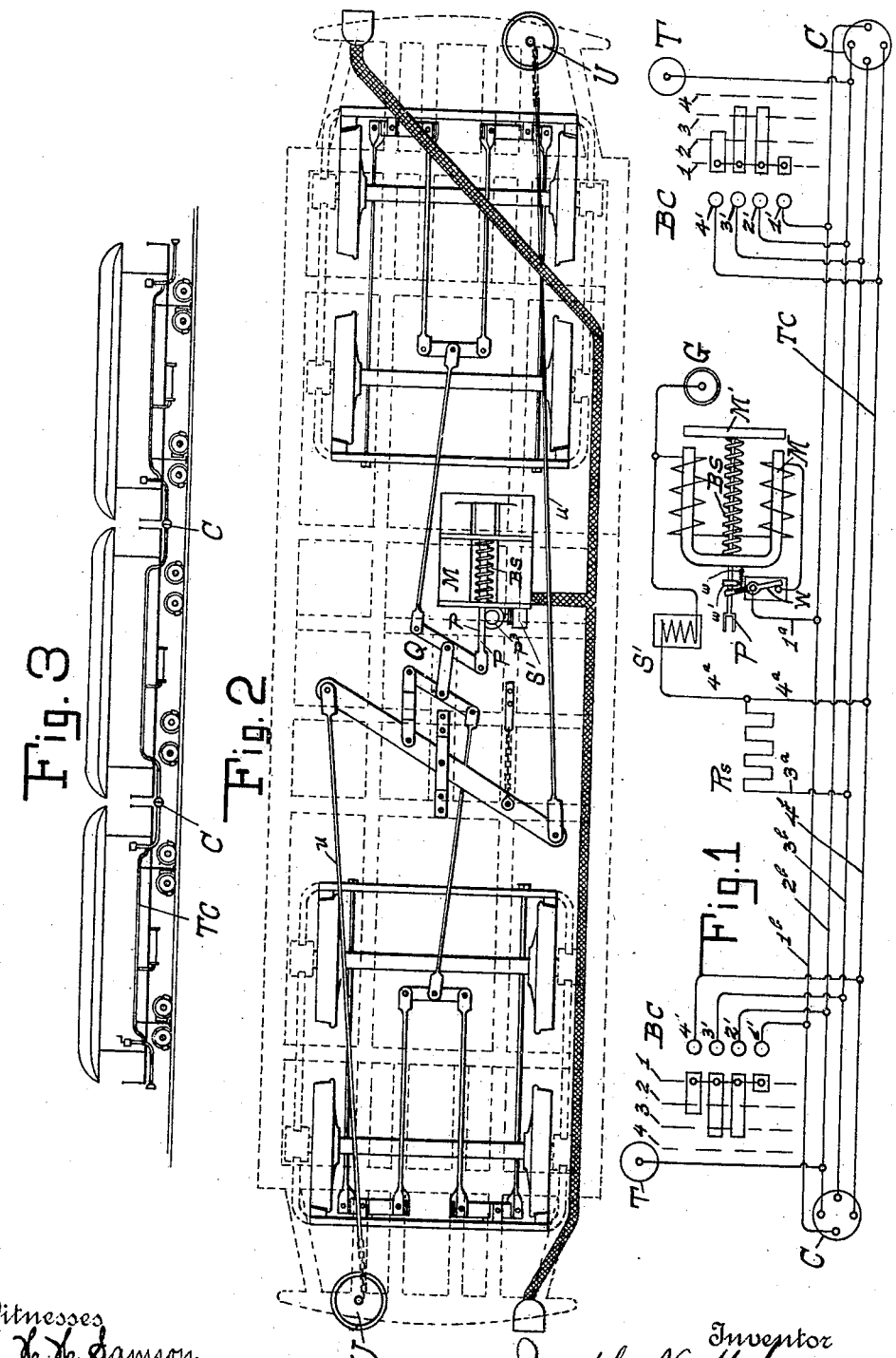

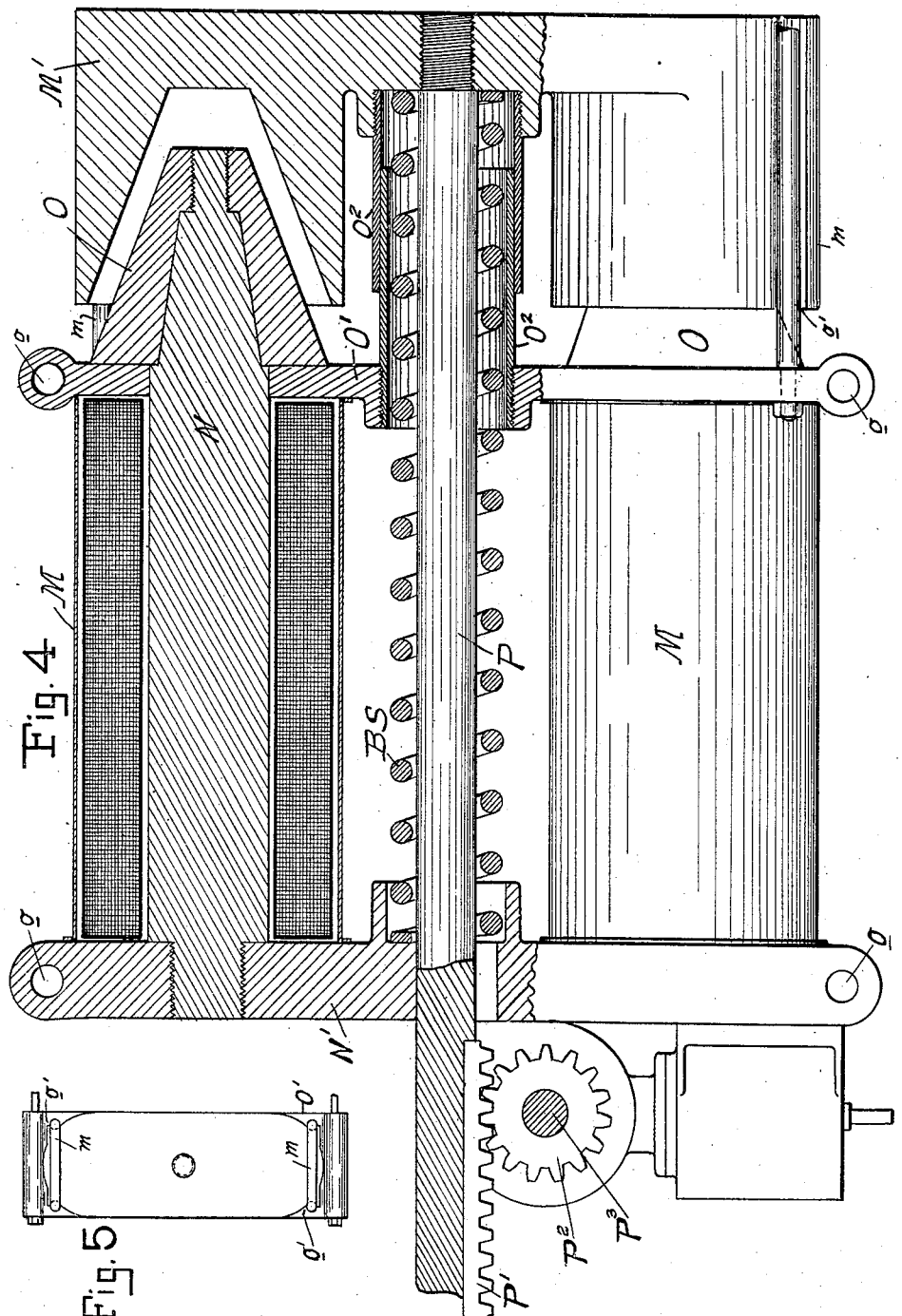

J. N. MAHONEY.
BRAKE FOR VEHICLES.
APPLICATION FILED JUNE 2, 1905.

PATENTED NOV. 5, 1907.

3 SHEETS—SHEET 3.

Witnesses
L. H. Samson.
L. F. Browning.

Inventor
Joseph N. Mahoney
By his Attorney
Edward C. Davidson

UNITED STATES PATENT OFFICE.

JOSEPH NATHANIEL MAHONEY, OF BROOKLYN, NEW YORK, ASSIGNOR TO HIMSELF, AND JAMES D. LEYS AND SAMUEL JACOBSON, OF NEW YORK, N. Y.

BRAKE FOR VEHICLES.

No. 870,188.  Specification of Letters Patent.  Patented Nov. 5, 1907.

Application filed June 2, 1905. Serial No. 263,417.

*To all whom it may concern:*

Be it known that I, JOSEPH NATHANIEL MAHONEY, a citizen of the United States of America, residing in the borough of Brooklyn, county of Kings, State of New York, have invented certain new and useful Improvements in Brakes for Vehicles, of which the following is a specification.

I employ a spring whose reaction brings braking surfaces into contact with requisite pressure. An electric motor of suitable construction overcomes the reaction of the spring and draws the braking surfaces out of braking relation. Retaining devices maintain the spring under such increased tension and hold the braking surfaces out of braking engagement, but may be released to allow the spring to apply the brakes. Such retaining devices may comprise an electro magnet or motor which, when energized, holds the brake spring under its increased tension and, when deënergized, permits its release and consequent application of the brakes.

Figure 6:
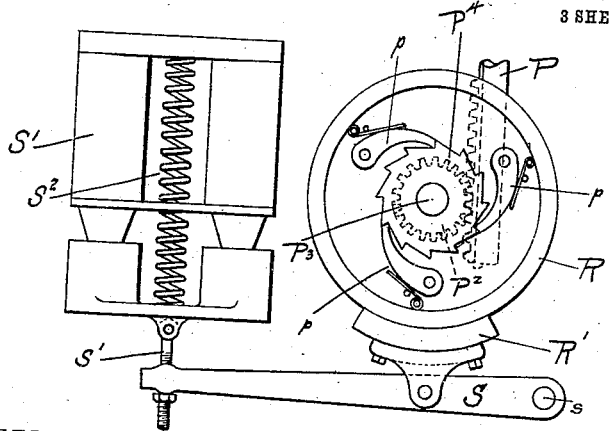
Figure 7:
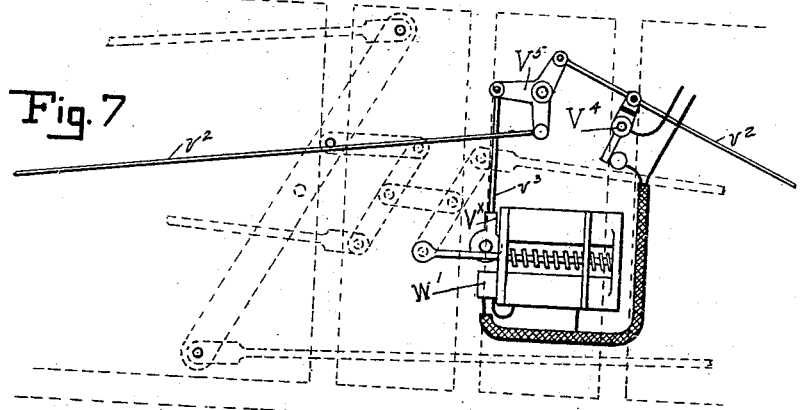
Figure 8:
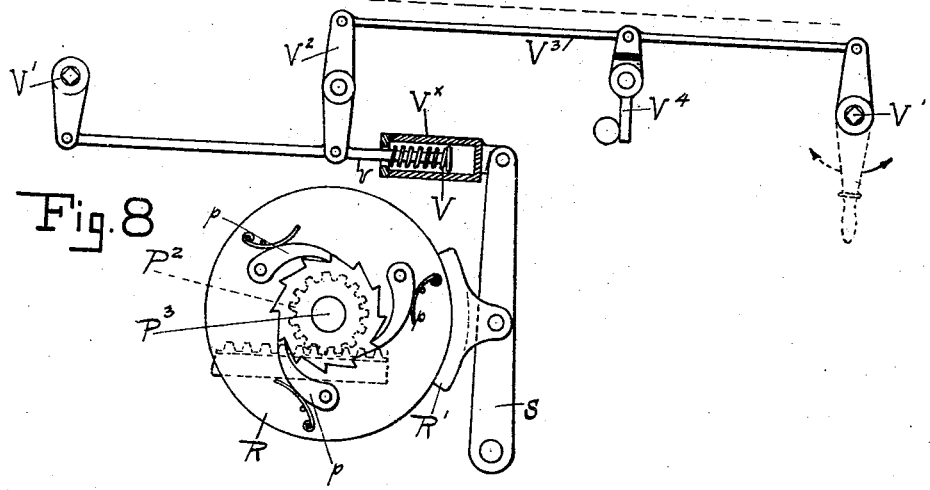

In the accompanying drawings: Figure 1 is a diagram illustrating the invention: Fig. 2, a bottom plan view of an electrically propelled car equipped with this invention, the ordinary driving motors being omitted. Fig. 3, an elevation showing three cars coupled by train cables, illustrating the application of this invention to the multiple unit system: Fig. 4, an enlarged sectional view of a suitable form of electric motor for overcoming the reaction of the brake applying spring and so holding the braking surfaces out of operative engagement: Fig. 5, an elevation of the right hand or armature end of this motor on a much reduced scale. Fig. 6, a detail view illustrating the construction and action of the electro-mechanical retaining devices: Figs. 7 and 8 are respectively detail views illustrating the tripping or releasing of the mechanical retaining device by mechanical means.

The friction brake system carried by the car may be of ordinary well-known type, and that indicated in Fig. 2 needs no description. Beneath the car platform is mounted an electric motor M, shown in detail in Fig. 4, and being, in this instance, an electro magnet having fixed wound cores N mounted in a back plate N' of magnetic metal, and having enlarged pole pieces O of the shape of the frustum of a cone. The iron back plate N', and front supporting plate O' of non-magnetic metal, are formed with suitable apertured ears $o$ for attachment to the car. The reciprocating armature M' has sockets of the same shape as the pole pieces and is attached to a piston rod P around which is arranged a heavy brake applying spring BS (in this instance shown as a compression spring) one end of which bears against the back plate N' and the other against the armature. The piston is guided by non-magnetic telescoping tubular pieces $O^2$ attached respectively to the armature and to the plate O' and has also a bearing in the plate N', beyond which it is formed with a rack P' meshing with a gear $P^2$ on the shaft $P^3$ of the retaining devices.

The armature M' is further guided between yokes $m$ connected to plate O' and fitted to grooves $o'$ in the armature, as indicated in Figs. 4 and 5. When the magnet is energized by passage of current from the trolley or third rail, or otherwise, its armature is attracted, the brake spring compressed, the retaining devices made effective, as presently described, and the shoes are withdrawn from the wheels by the action of the piston P upon the system of brake levers Q with which it is connected. The retaining device is shown in Fig. 6. When the magnet M is energized, piston P in its movement rotates shaft $P^3$ upon which is mounted a ratchet wheel $P^4$ which then turns in contact with spring-actuated pawls $p$, pivoted upon a wheel R having a periphery of suitable width and upon which bears a friction shoe R'. This shoe is pivotally connected to a lever S pivoted at $s$ and apertured near its free end for the passage of a threaded bolt $s'$ having an adjusting nut and pivotally connected with the armature of a magnet S' that may be in all respects the same in construction as the magnet or motor shown in greater detail in Fig. 4.

Reaction of spring $S^2$ tends at times to hold the friction shoe R' out of engagement with the wheel R. When, however, the magnet S' is energized and its armature is attracted, the friction shoe is applied to the wheel R, the brake spring BS is held under the further compression applied to it by the attraction of armature M' and the brake shoes are held out of engagement with the wheels of the vehicle. The brake release magnet S' may be charged by current from the trolley or other conductor as the case may be; and, when deënergized, automatic application of the brakes to the wheels by reaction of the spring BS occurs.

Referring now to the diagram, (Fig. 1) which indicates a suitable equipment for a single car for multiple unit-service, TC is a train cable provided with usual coupling sockets CC.

TT represents the trolleys or third-rail shoes, and BC are the brake controllers. The four positions of the brake controllers are indicated by vertical lines numbered 1, 2, 3, 4 passing through controller contact plates. 1', 2', 3' 4' indicate the coöperating contacts of the brake controller.

In the first or release position of the brake controller, current passes from trolley T to wire $2^b$ of the train cable; thence to controller contacts 2', 1', train cable conductor $1^b$, and wire $1^a$ to switch W through the points of which (closed by reaction of spring $w$) the circuit passes through the windings of the magnet M to ground or the other side of the circuit at G. Armature M' of magnet M is now attracted, reaction of the spring BS is overcome and the brakes are withdrawn from the wheels. When the brake shoes are so withdrawn, the points of the switch W, are opened by a collar or projection w' on the piston P and the spring BS under increased compression is maintained by the retaining devices, the circuit of the magnet S' being now closed through the controller contact 4', train cable conductor 4$^b$, a wire 4$^a$.

In the second or running position of the brake controller, the circuit of the motor M is opened at the controller contact 1' but the circuit of the magnet S' of the retaining devices is maintained.

In the third position of the controller, the pull of magnet S' is weakened by the introduction of resistance Rs, allowing a gradual application of the brakes by reason of gradual slip of friction shoe R' (Fig. 6). This resistance is inserted in the circuit by opening the circuit of S' at controller contact 4' and closing it at contact 3' through train cable conductor 3$^b$ and wire 3$^a$.

In the fourth or emergency braking position all circuits are open permitting the instant application of the brakes at their full pressure by unrestrained reaction of spring BS. In the case of train service, it is obvious that the brakes will be controlled in the way described from the brake controller on any of the units; and that in the event of a car or cars becoming detached the brake shoes of each of them will be automatically applied.

This invention contemplates the use of any appropriate electric motor for overcoming the reaction of the brake spring BS and so separating the braking surfaces of the vehicle; but I prefer to use a motor with a reciprocating armature. The special construction of motor shown forms the subject matter of another application filed by me.

By proper manipulation or vibration of the handle of the brake controller, the brakes may either be let on or off, gradually or instantly, according to the desire of the motorman in much the same way as an ordinary hand brake may be operated.

To provide for handling the car in the event of the motor M becoming inoperative, the usual hand brake staffs U are shown connected by rods u with the system of brake levers.

In Figs. 7 and 8, I have illustrated an arrangement in which the retaining devices are entirely mechanical and may be controlled manually at the will of the motorman. A convenient construction for this purpose embodies a spring V contained in a casing or cylinder V$^X$ pivotally connected in the end of the retaining device lever S and surrounding a headed rod v connected with the cranks of special brake-controlling staffs V', V',—in one case, directly; and in the other, through the medium of a pivoted lever V$^2$ and rod V$^3$ as somewhat diagrammatically shown in Fig. 8. The motor M will be the same in construction and operation as already described including the employment of the switch W, which, in Fig. 7, is supposed to be included within the switch box W'.

A second switch, V$^4$ operated by the manual controlling of the retaining devices, is also included in the circuit of the motor M. The reaction of spring V applies friction shoe R' to wheel R but may be overcome by the motorman's manipulation of the brake controller staff V' which is adapted to receive a suitable removable handle as indicated in dotted lines, Fig. 8. Initial movement of the brake controller staff V' in the direction of the solid arrow (Fig. 8) actuates the supplemental switch V$^4$, thereby opening the circuit of the motor M should the same not already have been opened by actuation of switch W, as already described. The brakes are now completely under control manually of the motorman who, by manipulation of the handle of the staff V', may at will vary pressure of the friction shoe R' upon wheel R, permitting such gradual application of the brakes as he may desire. In the same manner he may control the release of the brake shoes so as to let them off gradually at will; the movement of the handle of the staff V' enabling him intermittently to close and open the switch V$^4$ correspondingly charging and discharging the magnet M and, at the same time, controlling the pressure of friction shoe R' upon the wheel R. Such manual control of the retaining devices and motor M are indicated more in detail in Fig. 7 in which a three-armed lever V$^5$ is employed, two arms thereof being respectively connected by rods v$^2$ v$^2$, with the cranks of staffs V', V', and the third having connected to it a rod v$^3$ that corresponds with the rod v (Fig. 8) extending into the casing V$^X$ within which the spring V is contained.

The arrangement shown in Figs. 7 and 8 is intended for unit service. The construction is economical since the controllers BC, magnet S' and cable TC are dispensed with.

The motor M is claimed *per se* in another application filed by me July 1, 1905 Serial No. 267,915.

In another application filed by me October 30, 1905, Serial No. 284,986, I have claimed generally mechanical control of the braking apparatus as distinguished from the generic claims and those involving electrical means of control herein.

I claim as my invention:

1. In a braking system for vehicles, the combination of friction brake apparatus, a spring under tension whose reaction effects the pressure between the braking surfaces, an electric motor acting to increase tension of the spring and thereby relieve the pressure between said surfaces, switch devices under the control of the motorman whereby the motor may at will be energized to so further increase tension of the spring, means for then automatically opening the circuit of the electric motor, automatically acting power controlled means for retaining the brake spring under such further tension and means for at will automatically releasing the retaining devices to permit engagement of the braking surfaces by reaction of the brake spring.

2. In a braking system for vehicles, the combination of friction brake apparatus, a spring under tension whose reaction effects the pressure between the braking surfaces, an electric motor acting to increase tension of the spring and thereby relieve the pressure between said surfaces, switch devices under the control of the motorman whereby the motor may at will be energized to so further increase tension of the spring, means for then automatically opening the circuit of the electric motor, automatically acting power controlled means for retaining the brake spring under such further tension and means for at will releasing the retaining devices to permit engagement of the braking surfaces by reaction of the brake spring.

3. In a braking system for vehicles, the combination of friction brake apparatus, a spring under tension whose reaction effects the pressure between the braking surfaces, an electric motor for further increasing tension of the spring and relieving the pressure between said surfaces, switch devices under the control of the motorman whereby the motor may at will be energized to so further increase tension of the spring, means for then automatically opening the circuit of the electric motor, automatically acting power controlled means for retaining the brake spring under such further tension and electro magnetic means for at will automatically releasing the retaining devices to permit engagement of the braking surfaces by reaction of the brake spring.

4. In a braking system for vehicles, the combination of friction brake apparatus, a spring under tension whose reaction effects the pressure between the braking surfaces, an electric motor for further increasing tension of the spring, means for retaining the spring under such increased tension, electro magnetic means for releasing the retaining devices, a brake controller and its contacts and circuit connections, whereby, in one position thereof, the motor is energized to subject the brake spring to such further tension and the electro-magnetic device of the retaining devices energized to thereby retain the brake spring under such further tension; in another position, a resistance is introduced into the circuit of such electro magnetic device; and in another position, such electro magnetic device deënergized to thereby release the retaining devices and permit the re-action of the brake spring to bring the braking surfaces into engagement.

5. In a braking system for vehicles, the combination of friction brake apparatus, a spring under tension whose reaction effects the pressure between the breaking surfaces, an electric motor for further increasing tension of the spring, a brake controller and means whereby on movement of the controller from maximum braking position said retaining means are first set to retain increased tension of the spring and then the circuit of the motor is closed, and on partial reverse movement of the controller the motor circuit is opened and on further reverse movement the retaining devices may be controlled to permit desired application of the brakes.

6. In a braking system for vehicles, the combination of friction brake apparatus, a spring under tension whose reaction effects the pressure between the braking surfaces, an electric motor for further increasing tension of the spring, means for retaining the spring under such further tension, a brake controller and means whereby on movement of the controller from maximum braking position said retaining means are first set to retain increased tension of the spring and then the circuit of the motor is closed, and on partial reverse movement of the controller the motor circuit is opened and on further reverse movement the retaining devices may be controlled to permit desired application of the brakes and means independent of the controller automatically acting to open the motor circuit when desired maximum tension has been imposed upon the spring, and to close such break in the circuit on reduction of such maximum tension.

7. In a braking system for vehicles, the combination of friction brake apparatus, a spring under tension whose reaction effects the pressure between the braking surfaces, an electric motor for further increasing tension of the spring, means for retaining the spring under such increased tension, electro magnetic means for releasing the retaining devices, a brake controller and means whereby on movement of the controller from maximum braking position said retaining means are first set to retain increased tension of the spring and then the circuit of the motor is closed, and on partial reverse movement of the controller the motor circuit is opened and on further reverse movement the retaining devices may be controlled to permit desired application of the brakes.

8. In a braking system for vehicles, the combination of friction brake apparatus, a spring under tension whose reaction effects the pressure between the braking surfaces, an electric motor for further increasing tension of the spring, means for retaining the spring under such increased tension, electro magnetic means for releasing the retaining devices, a brake controller and means whereby on movement of the controller from maximum braking position said retaining means are first set to retain increased tension of the spring and then the circuit of the motor is closed, and on partial reverse movement of the controller the motor circuit is opened and on further reverse movement the retaining devices may be controlled to permit desired application of the brakes and means independent of the controller automatically acting to open the motor circuit when desired maximum tension has been imposed upon the spring, and to close such break in the circuit on reduction of such maximum tension.

9. In a braking system for vehicles, the combination of two or more vehicles coupled into a train, a brake controller and train cable on each vehicle, the several train cables being electrically coupled, and on each vehicle a braking system comprising the combination of friction brake apparatus, a spring under tension whose reaction effects the pressure between the braking surfaces, an electric motor acting to increase tension of the spring and relieve the pressure between the braking surfaces, electro magnetic devices for retaining this spring under such further tension and circuit connections whereby on movement from maximum braking position of the controller on any one of the vehicles the circuit of the electro-magnetic retaining devices is first closed and then the motor circuit is closed while that of the retaining devices remains closed, and on partial reverse movement the motor circuit is opened and on further reverse movement the retaining devices may be controlled to permit desired application of the brakes.

10. In a braking system for vehicles, the combination of two or more vehicles coupled into a train, a brake controller and train cable on each vehicle, the several train cables being electrically coupled, and on each vehicle a braking system comprising the combination of friction brake apparatus, a spring under tension whose reaction effects the pressure between the braking surfaces, an electric motor acting to increase tension of the spring and relieve the pressure between the braking surfaces, electro magnetic devices for retaining this spring under such further tension and circuit connections whereby on movement from maximum braking position of the controller on any one of the vehicles the circuit of the electro-magnetic retaining devices is first closed and then the motor circuit is closed, and on partial reverse movement the motor circuit is opened and on further reverse movement the retaining devices may be controlled to permit desired application of the brakes and means independent of the controller for automatically opening the circuit of the motor when desired maximum tension has been imposed upon the spring and to close such break in the circuit on reduction of such maximum tension.

11. In a braking system for vehicles, the combination of friction brake apparatus, a spring under tension whose reaction effects the pressure between the braking surfaces, an electric motor acting to increase tension of the spring and thereby relieve the pressure between said surfaces, switch devices under the control of the motorman whereby the motor may at will be energized to so further increase tension of the spring, means for then automatically opening the circuit of the electric motor, automatically acting power controlled means for retaining the brake spring under such further tension and electro magnetic means for at will releasing the retaining devices to permit engagement of the braking surfaces by reaction of the brake spring.

12. In a braking system for vehicles, the combination of friction brake apparatus, a spring under tension whose reaction effects the pressure between the braking surfaces, an electric motor acting to increase tension of the spring and thereby relieve the pressure between said surfaces, switch devices under the control of the motorman whereby the motor may at will be energized to so further increase tension of the spring, means for then automatically opening the circuit of the electric motor, automatically acting power controlled means for retaining the brake spring under such further tension and power operated means under the control of the motorman for at will releasing the retaining devices to permit engagement of the braking surfaces by reaction of the brake spring.

In testimony whereof, I have hereunto subscribed my name.

JOSEPH NATHANIEL MAHONEY.

Witnesses:
L. F. BROWNING,
E. F. WICKS.